United States Patent [19]

Richaud

[11] Patent Number: 4,998,366

[45] Date of Patent: Mar. 12, 1991

[54] MECHANISM FOR DRIVING A PLURALITY OF OBJECTS ALONG RELATIVE RECIPROCATING PATHS ALTERNATINGLY IN THE SAME DIRECTION AND IN AN OPPOSITE DIRECTION

[76] Inventor: Michel J. Richaud, 226 rue de Vaugirard, 75015 Paris, France

[21] Appl. No.: 175,841

[22] Filed: Mar. 31, 1988

Related U.S. Application Data

[63] Continuation-in-part of PCT FR87/00307 filed Aug. 5, 1987

[30] Foreign Application Priority Data

Aug. 5, 1986 [FR] France .................................. 86 11302

[51] Int. Cl.⁵ .............................................. G09F 13/00
[52] U.S. Cl. ........................................ 40/547; 40/416; 40/414; 40/423; 40/425

[58] Field of Search .................................. 40/416–420, 40/425, 414, 423, 429, 547; 74/435, 437

[56] References Cited

U.S. PATENT DOCUMENTS

| 616,022 | 12/1898 | Schild ...................................... | 40/416 |
| 916,105 | 3/1909 | Clark ........................................ | 40/416 |
| 1,140,675 | 5/1915 | Gottschlk et al. ..................... | 40/429 |
| 2,711,603 | 6/1955 | Seidl ........................................ | 40/416 |
| 4,237,634 | 12/1980 | Pokhis .................................... | 40/425 |
| 4,344,243 | 8/1982 | Reszka .................................... | 40/414 |

*Primary Examiner*—Kenneth J. Dorner
*Assistant Examiner*—J. Hakomaki

[57] ABSTRACT

Motion transmission apparatus for driving a plurality of objects along relative paths alternately in the same direction and in an opposite direction includes a plurality of toothed drive members constrained to moved in unison and intermesh respectively with a corresponding number of driven gears. Each driven gear is eccentrically connected to an associated rocker arm by a connecting rod. The rocker arms carry the objects to be moved.

12 Claims, 6 Drawing Sheets

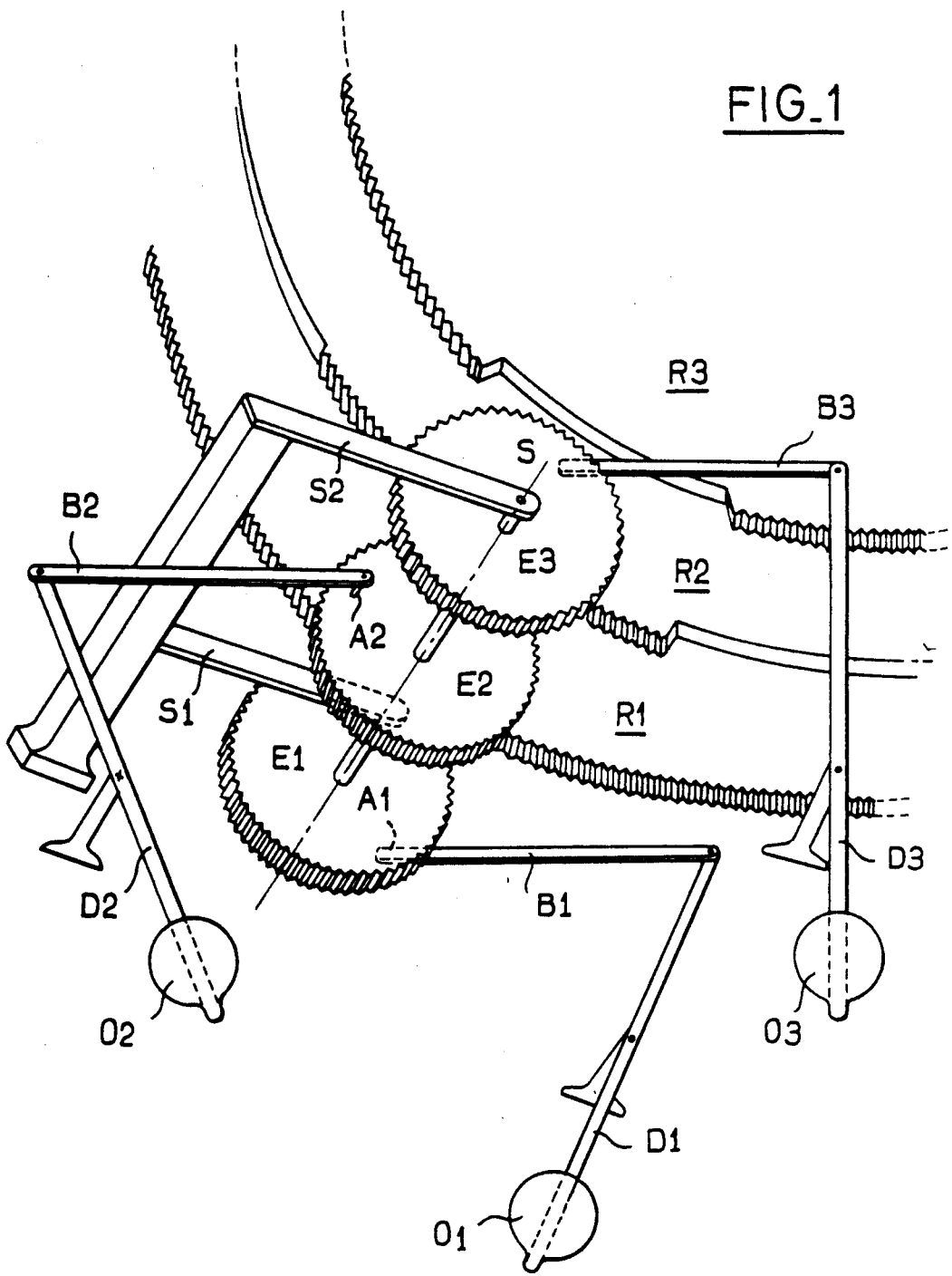
FIG_1

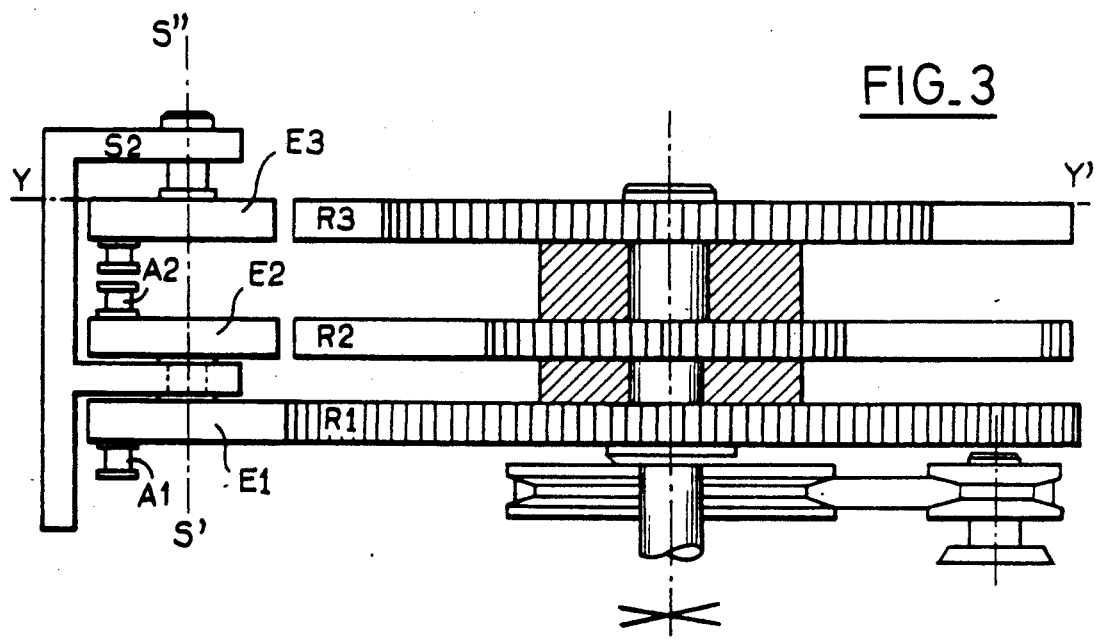
FIG_3
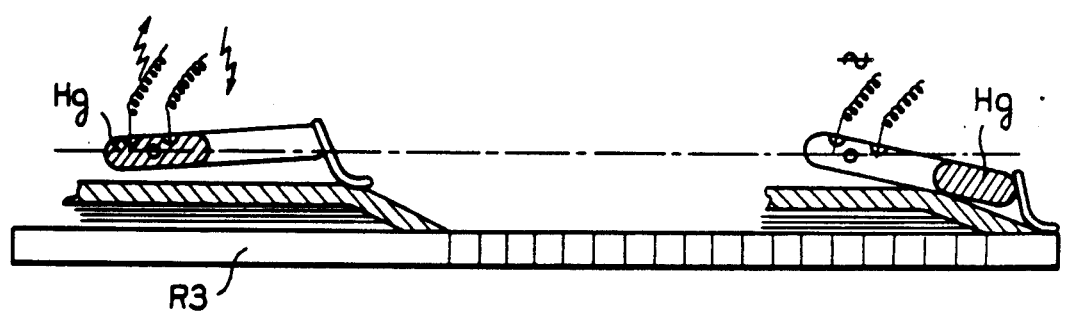
FIG_4
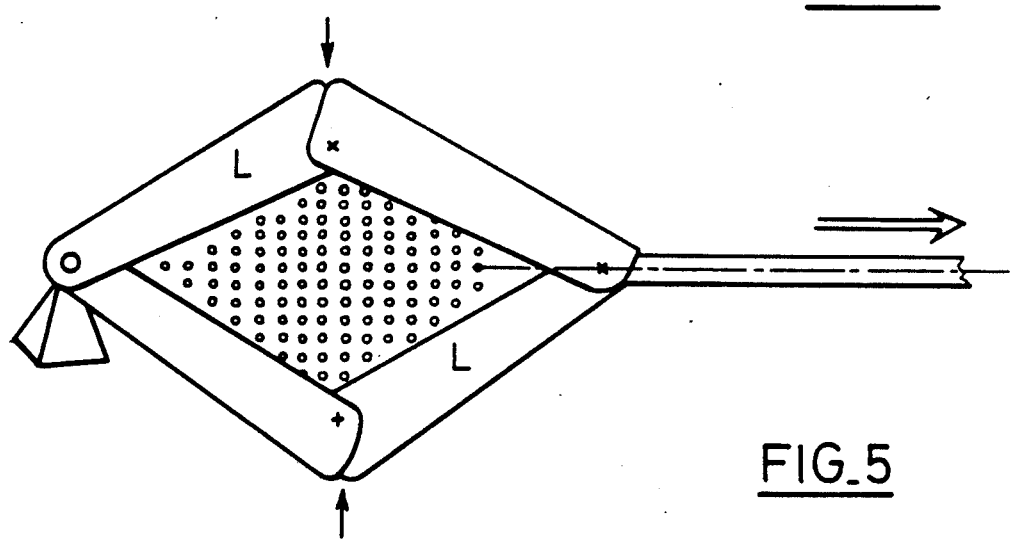
FIG_5

FIG_7

MECHANISM FOR DRIVING A PLURALITY OF OBJECTS ALONG RELATIVE RECIPROCATING PATHS ALTERNATINGLY IN THE SAME DIRECTION AND IN AN OPPOSITE DIRECTION

The invention described relates to a mechanical device for enabling moving objects located closed to one another (filters, screens, figures, windscreen wipers, etc.) to have reciprocating paths in the same direction and then in opposite directions in a cyclical manner by stopping one of the objects for half a cycle (half a go and return cycle) by interrupting the motion transmitted thereto.

There exist numerous partially-toothed mechanical gear systems, which on coming into contact with wheels that have teeth all around their peripheries transmit (or not as the case may be) a discontinuous and oscillating output motion. One such device is described, in particular, in French patent application FR 2 486 611. These devices make use of the absence of teeth on gear wheels or belts (in which case the teeth would be outwardly directed), but even when used in pairs, such devices do not enable same-direction motions to change their directions of travel.

In comparison with such devices, the invention seeks to add opposite direction motion giving rise to cyclic converging and diverging motion prior to returning to same-direction motion.

According to a first characteristic, the device comprises:

(a) a plurality of toothed drive means, one of which has teeth all around its periphery;

(b) a corresponding number of driven toothed gear wheels meshing with respective driving toothed means;

(c) object-carrying pivoting rods pivotally driven by the driven gear wheels via:

(d) connecting rods excentrically pivoted on said driven gear wheels.

Apart from the fully-toothed gear wheel or belt (having outwardly directed teeth), the other drive means mounted on a common axis and constrained to rotate together are lacking in teeth over a zone corresponding to one half of the circumference of the driven gear wheels.

Likewise, the number of teeth on the peripheries of the driving means is a multiple of the number of teeth on the driven gear wheels, for example three or four times greater. With the driven gear wheels being, in addition, independent from one another.

It is possible to add a selectively closable electrical contact to said assembly of toothed wheels and rods, e.g. a mercury contact system, with said electrical contact being urged against a slope carried by one of the toothed wheels, for example for the purpose of sequentially switching on a discharge tube representing a pair of spectacles in an application concerning the provision of an illuminated sign.

In this context of an illuminated sign, the object-carriers following same-direction paths and then oppositedirection paths may carry color filters which are interposed between a source of light and a boundle of optical fibers whose ends are disposed so as to occupy the representation of the eyes within the illuminated sign. The colored light passing through the filters will represent the presence of the irises and their back-and-forth motion.

Since there is no limit on the number of drive wheel plus driven wheel plus connecting rod assemblies, one of the driven gear wheels can be given over to actuating a set of plates linked together in a diamond shape for selectively interrupting the light rays from the optical fibers.

By way of example, the accompanying drawings show:

FIG. 1 is a detailed view of gear wheels, E1, E2, and E3, together with their systems of linked rods B and D for pivoting objects O and their contacts with toothed wheels R (which are completely toothed or only partially toothed);

FIG. 2 is a plan view showing the gear ratios between the toothed wheels and the resulting effects on the link rods.

FIG. 3 is an overall section view on line YY';

FIG. 4 shows an example of an additional electric circuit being switched on by rocking a mercury capsule;

FIG. 5 shows a system for obscuring a light beam by closing or opening a set of blades linked together in a diamond shape;

Figure 6:
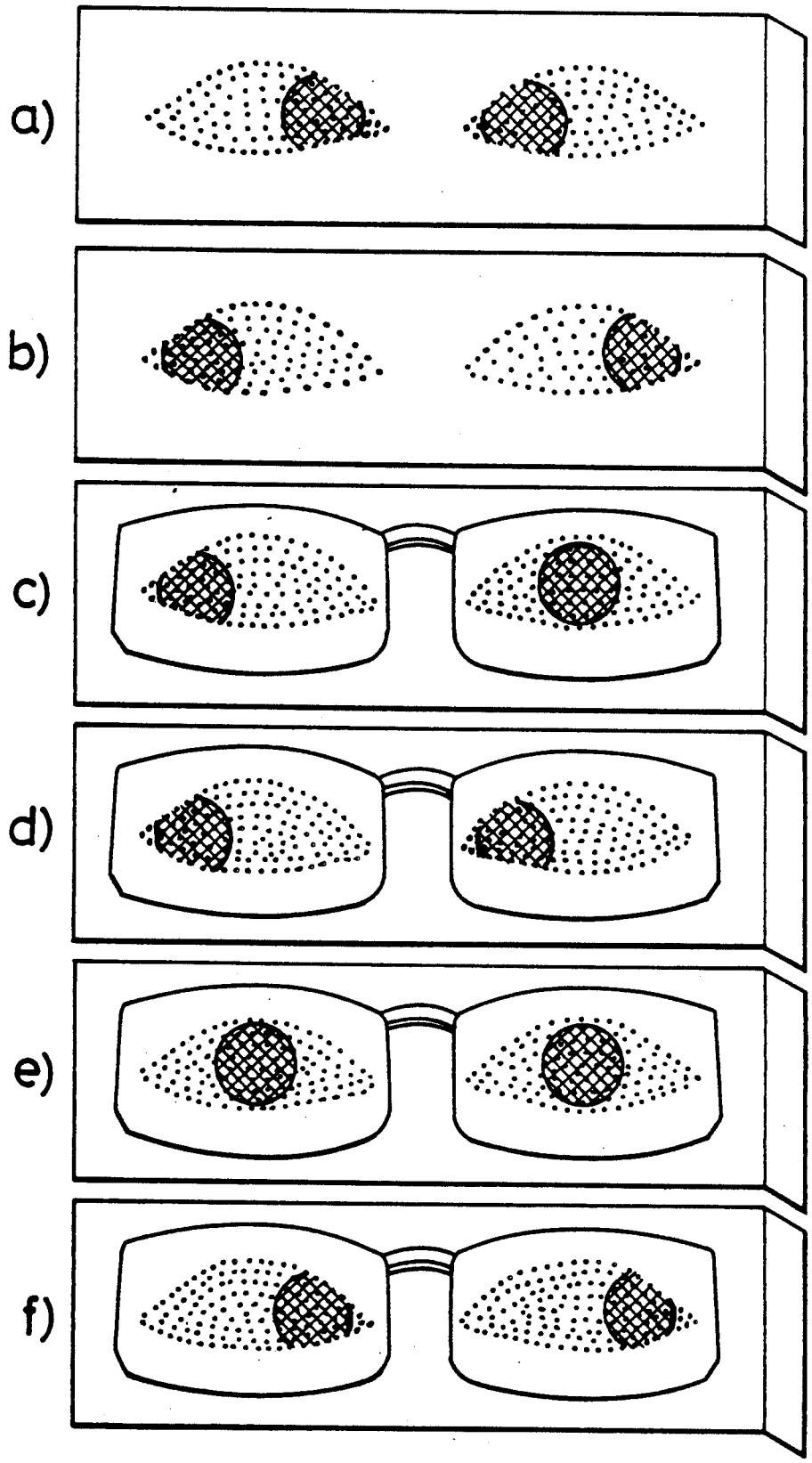
Figure 7:
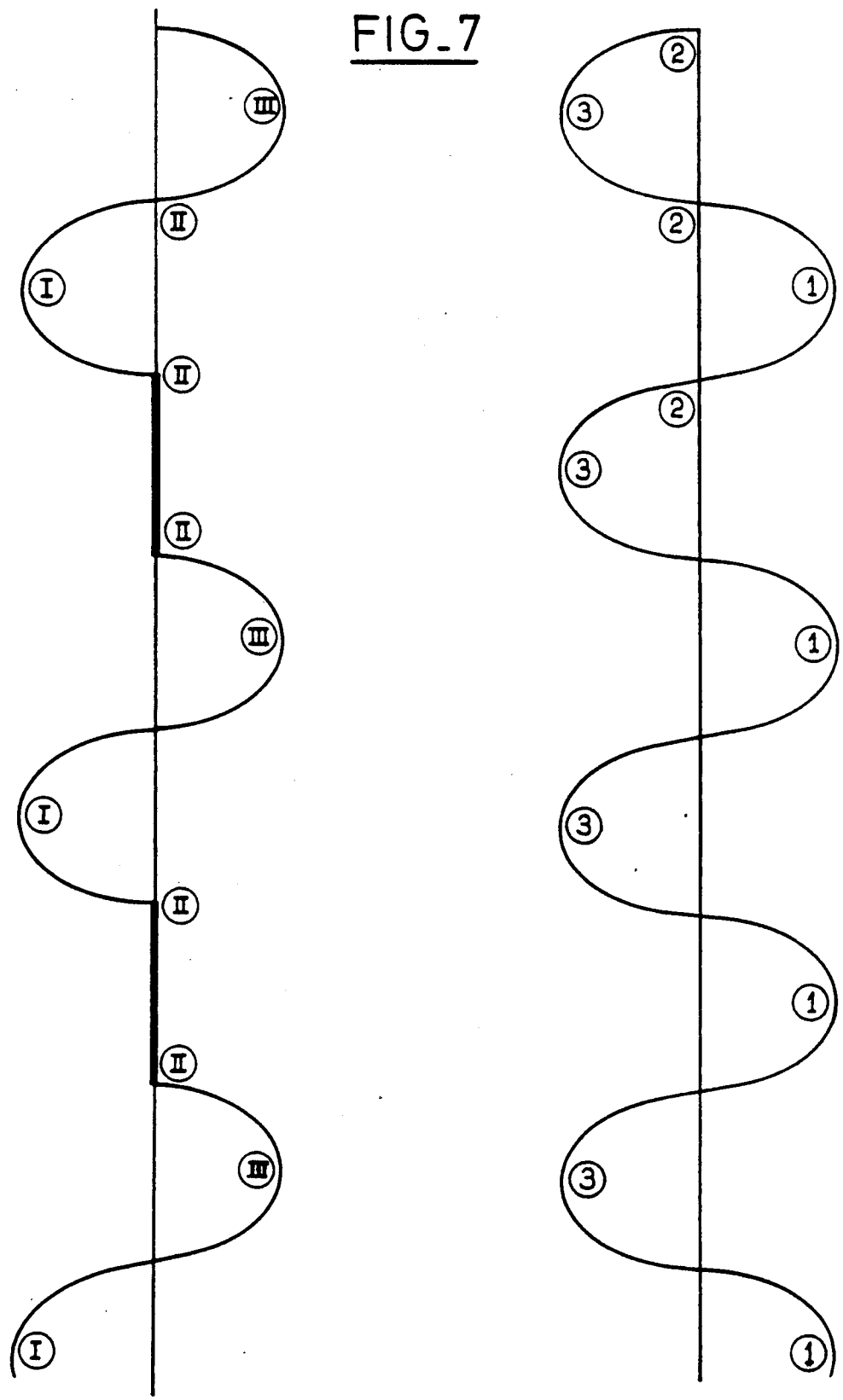

FIG. 6 shows how a sequence may run on an illuminated sign for use by opticians, and making use of screens (color filters) as the moving objects having reciprocating motion over a light-emitting surface for the purpose of modifying the color and the shape of the light pattern emitted; by using optical fibers disposed to occupy an outline representing two eyes, the shadow (or imposed color) resulting from the objects moving over the starting ends of the optical fibers will appear in the two eyes as two irises moving back-and-forth; and FIG. 7 compares two sinusoidal paths of two moving objects which are successively in-phase and then antiphase, with the motion of one of the moving objects being interrupted for a half period.

Figure 8:
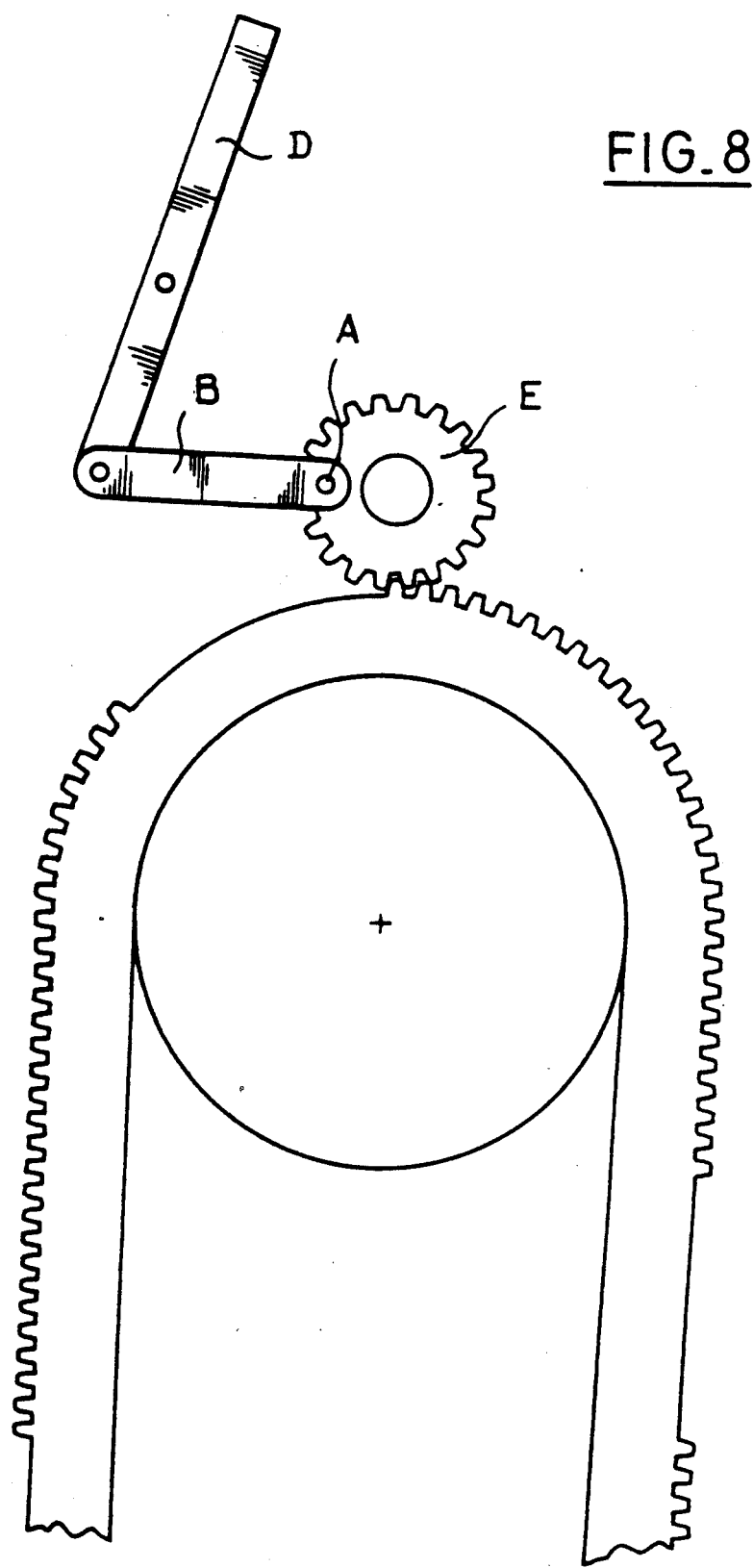

FIG. 8 shows another embodiment of the invention wherein a typical drive member comprises a toothed belt having toothless zones.

Figures 2A, 2B:
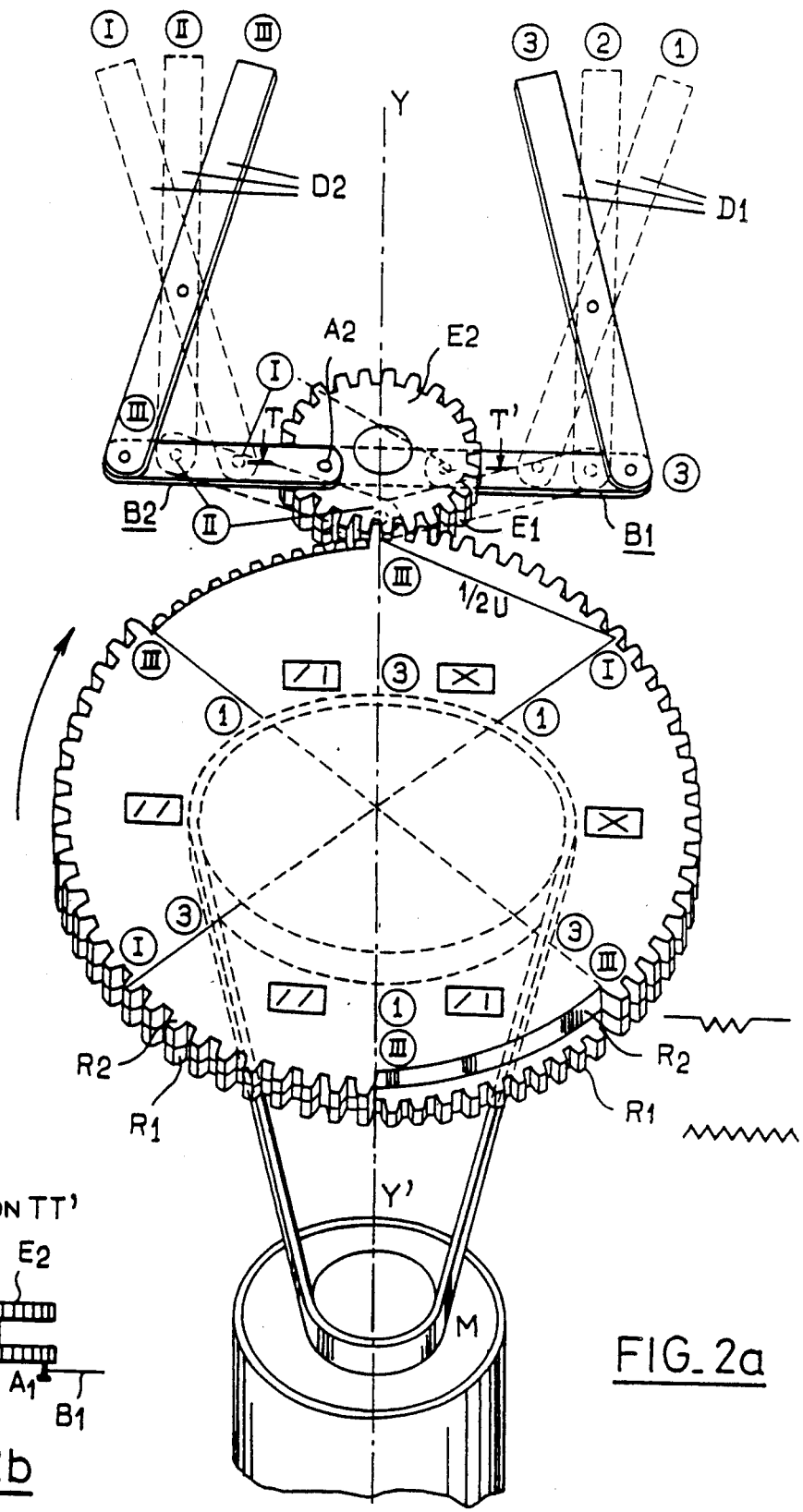
FIG. 2b is a section on TT' through two driven gear wheels together with a representation of the rods B1 and B2 running from excentric pivot axes A.

With reference to FIG. 1 and 2, the device comprises two, three, or more sets of gears. It is driven by a stack of toothed wheels R1, R2, and R3 which are constrained to rotate together, with at least one of the wheels having teeth all the way around its periphery, and with gear wheels E1, E2, and E3 being placed on a common axis S' and S" in such a manner as to enable of them to rotate freely and independently of the others in spite of the wheels carrying small excentric pins A1, A2, and A3 fixed near the peripheries thereof. Gear wheel supports S1 and S2 may be provided respectively between gear wheels E1 and E2, then between gear wheels E3 and E4, . . . . The small excentric pins A1, A2, and A3 then act on connecting rods B1, B2, and B3 which in turn act on rocker arms D1, D2, and D3 each having one end fitted with an object carrier or with an object to be moved per se.

The driving toothed wheels R1, R2, and R3 are all of the same diameter and their circumference (in number of teeth) is a multiple of the circumference of the gear wheels E (three times in the example in FIG. 2) where U is the number of teeth on each driven wheel. Whereas wheel R1 has teeth all around its periphery, the other wheels R2 and R3 have toothless sectors facing the driven wheels E2 and E3. As they rotate, the arrival of these toothless sections causes the facing driven wheels to cease being driven. However the assembly R1, R2, and R3 continues to rotate as a single unit.

Consider the work of R2 which lacks teeth over a length equal to U/2 (see FIG. 2). The contact with wheel E2 will be suspended and object 02 will remain stationary while object 01 continues to be driven back and forth by wheel R1 having a full set of teeth. When the teeth reengage, wheel E2 continues to rotate with half a turn of delay compared with wheel E1, and as a result pin A1 lies over pin A2, with the superposition causing the objects 01 and 02 to be driven with a same direction (parallel) motion by the intervening connecting rods. Since the total number of remaining teeth is a multiple of U/2, the pins A1 and A2 will again be diametrically opposed after the toothless sector of length U/2 on wheel R2 has again gone past, thereby imposing opposite-direction motion on the objects.

It may be observed that if the total number of teeth on the driving wheels is a multiple of the total number of driven teeth and if the basic toothed and non-toothed sectors occupy multiples of U/2, then in order to ensure that the apparatus operates properly, one or two additional teeth should be removed from the following U/2 toothed zone so that the tooth which takes up engagement is offset relative to the tooth which left off engagement, given that the toothed wheel remains stationary as soon as it loses drive from the last tooth.

In FIG. 2, same or parallel direction paths are represented by //, opposite-direction paths are represented by X, and paths including a stationary object are represented by /|.

A further assembly E3, R3 etc. could be added to drive a third object in a different manner giving rise to an additional different working cycle. In the illuminated sign, E3 will be used for closing a space by pulling on four moving blades L shown in FIG. 5.

It has been shown that this mechanism is particularly suitable for illuminated advertising signs for opticians. FIGS. 6a, 6b, 6c, 6d, 6e, and 6f show two eyes constituted by the light-emitting points at the ends of optical fibers whose opposite ends are illuminated by a concentrated source of light encountering moving colored filters 01 and 02 as obstacles. These small round filters transmit colored light to predetermined points in the irises, and by virtue of the invention the irises will follow paths which sometimes converge and diverge, and which sometimes go in the same direction. This natural motion will be combined with illuminating the spectacles (the profile of a discharge tube or a dotted line provided by fiber optics, etc.) in order to show that spectacles can correct squinting. This illumination occurs by tilting a capsule of mercury Hg (in this example) and is caused by a slope which is fixed to one of the wheels (the wheel on top of FIG. 4) which raises said capsule at a particular moment in the rotation of driving wheel R3.

In addition to the back-and-forth paths of the objects 01 and 02, a third assembly R3, E3, D3 may be used for driving a set of rods which closes access to light rays which would otherwise enter the optical fibers (see FIG. 5). By closing the blades L which are articulated in the form of a deformable diamond shape, the fibers reaching the eye will be progressively switched off, thereby simulating a wink. When it opens, with both irises properly positioned, the outline of a pair of spectacles is added to the sign by being switched on due to the mercury switch tilting as described above. The irises then continue to move in parallel.

The invention can also be used to represent searchlight beams moving over the sky, flames moving apparently randomly and fluctuating in brilliance, crazy windscreen wipers, etc. Additional wheels R3, R4, . . . can always be added to provide independent cyclic operations and the mercury switch can be used for switching electrical devices on and off.

In a variant, as illustrating in FIG. 8, toothed belts may be used having their teeth directed outwardly and replacing the wheels R1, R2, and R3 for driving the driven wheels E1, E2, and E3. The belts will also have toothless sectors, and the same effect can be provided over a greater development (program length) with a larger number of repetitive cycles.

I claim:

1. Motion transmission apparatus for driving a plurality of objects along relative paths alternately in the same and in opposite directions and comprising a plurality of gear wheels, drive means for rotating said gear wheels and imparting intermittent rotary motion to at least one of said gear wheels and including a plurality of drive members equal in number to said gear wheels and constrained for movement in unison, each of said drive members having a plurality of teeth thereon for intermeshing engagement with teeth on an associated one of said gear wheels, at least one of said drive wheels having a toothless zone intermediate the teeth thereon, a plurality of connecting rods having first and second ends, each of said connecting rods having its first end pivotally connected to an associated one of said gear wheels in eccentric relation to the axis thereof, and means for carrying objects to be driven and including a plurality of rocker arms and means supporting each of said rocker arms for pivotal movement about an associated rocker axis, each of said rocker arms being pivotally connected in spaced relation to its rocker axis to the second end of an associated one of said connected rods.

2. Motion transmission apparatus as set forth in claims 1 characterized by at least one of said drive members comprising a fully toothed drive member.

3. Motion transmission apparatus as set forth in claim 1 wherein the length of said toothless zone on said one drive member is substantially equal to one half the circumference of an associated one of said gear wheels driven by said one drive member.

4. Motion transmission apparatus as set forth in claim 1 wherein said drive members comprise toothed drive wheels constrained to rotate in unison about a common axis and said gear wheels are supported for independent rotation about another common axis.

5. Motion transmission apparatus as set forth in claim 1 wherein the number of teeth on each of said drive members comprises a multiple of the number of teeth on said associated one of said drive wheels.

6. Motion transmission apparatus as set forth in claim 1 wherein said apparatus comprises part of an a illuminated sign and includes an electrically operated light source, switching means for operating said light source, and means for intermittently operating said switching means to activate said light source in response to operation of said apparatus.

7. Motion transmission apparatus as set forth in claim 6 wherein said switching means comprises a mercury switch supported for pivotal movement and said means for intermittently operating said switching means includes a cam for pivoting said mercury switch in response to operation of said drive means.

8. Motion transmission apparatus as set forth in claim 1 wherein said apparatus comprises a part of a sign which includes the representation of two eyes and said apparatus includes two groups of optical fibers, means for providing a source of light at one end of each of said groups of optical fibers, the other end of each of said groups of optical fibers comprising one of said eyes.

9. Motion transmission apparatus as set forth in claim 8 including a pair of color filters, each of said color filters being supporting on by associated one of said rocker arms for movement relative to said other end of an associated one of said groups of optical fibers to simulate displacement of the irises of said eyes.

10. Motion transmission apparatus as set forth in claim 9 including means for selectively skewing light rays emanating from said other ends of said optical fibers in response to operation of said apparatus.

11. A mechanical device for driving a plurality of objects along relative reciprocating paths alternatingly in the same direction and in opposite directions, comprising:
  a plurality of coaxial toothed drive wheels having the same diameter, all constrained to rotate together, at least one of the toothed drive wheels being toothless over a portion of its periphery,
  a corresponding number of coaxial driven gear wheels having the same diameter and the same number of teeth, respectively meshing with the toothed drive means, wherein the number of teeth of the fully toothed drive wheels is a multiple of the number of teeth provided on said driven gear wheels and the toothless zone of at least one of the toothed drive means correspond to half the circumference of a toothed driven gear wheel,
  eccentric pins fixed to a respective driven gear wheel,
  a plurality of connecting rods having a first end connected to pivot on a respective eccentric pin, and
  a plurality of rocker arms supported to pivot, which carry respectively an object and are connected to a second end of a respective connecting rod.

12. A mechanical device for driving at least two object along relative reciprocating paths alternatingly in the same direction and in opposite directions comprising:
  at least a first and a second coaxial toothed drive wheels having the same diameter, both constrained to rotate together, said first toothed drive wheel being fully toothed at its periphery, while said second toothed drive wheel is only partially toothed at its periphery,
  at least two coaxial driven gear wheels having both the same diameter and the same number of teeth, respectively meshing with the toothed drive means, wherein the number of teeth of said first fully toothed drive wheel is a multiple of the number of teeth provided on said driven gear wheels, and the toothless zone of the second partially toothed drive wheel corresponds to half the circumference of a toothed driven gear wheel,
  at least two eccentric pins respectively fixed to a driven gear wheel, p1 at least two connecting rods having a first end connected to pivot on a respective eccentric pin, and
  at least two rocker arms supported to pivot, which carry respectively said two objects, and are connected to a second end of a respective connecting rod.

* * * * *